2,262,995

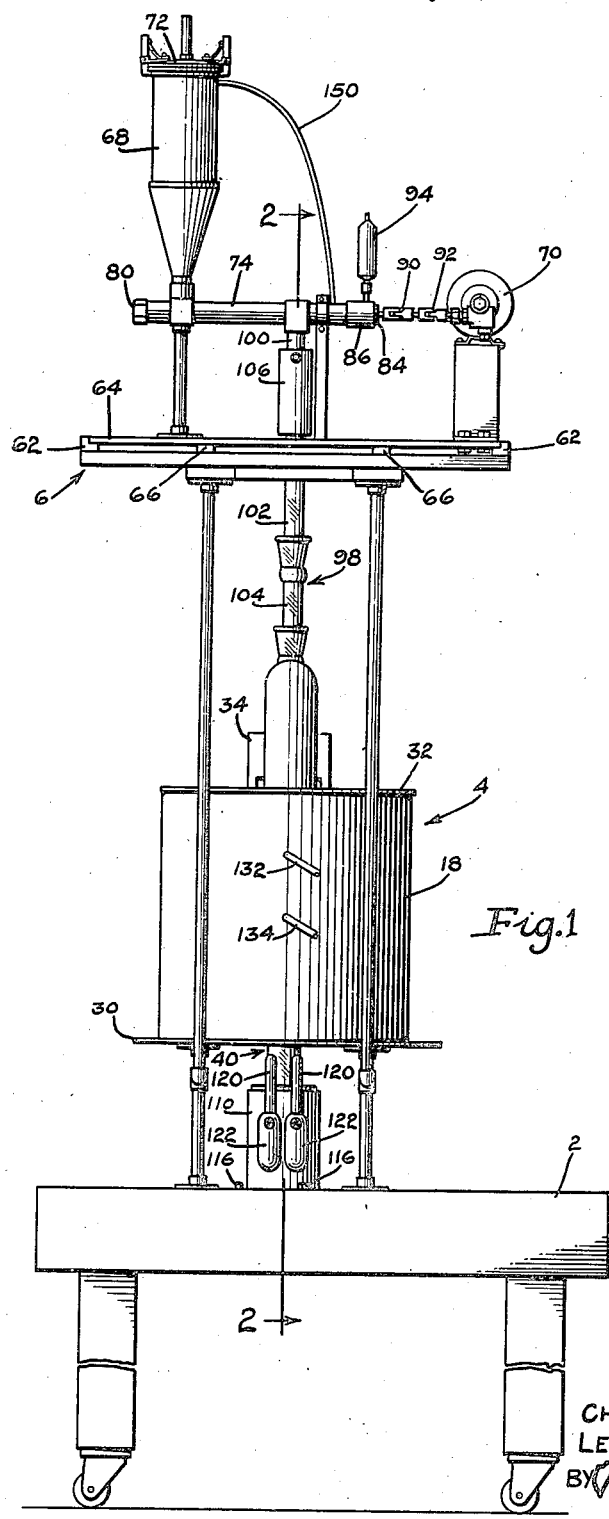

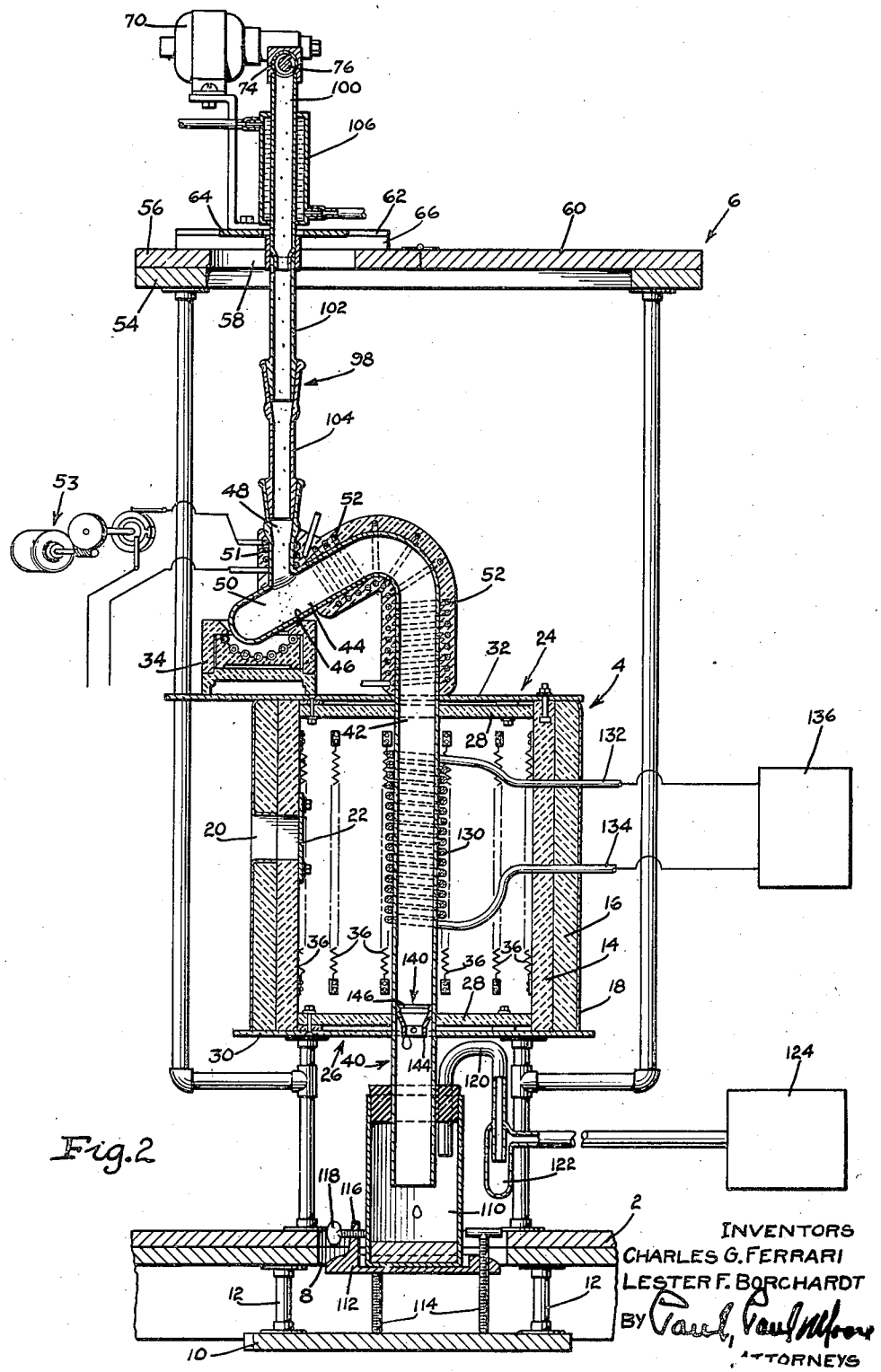

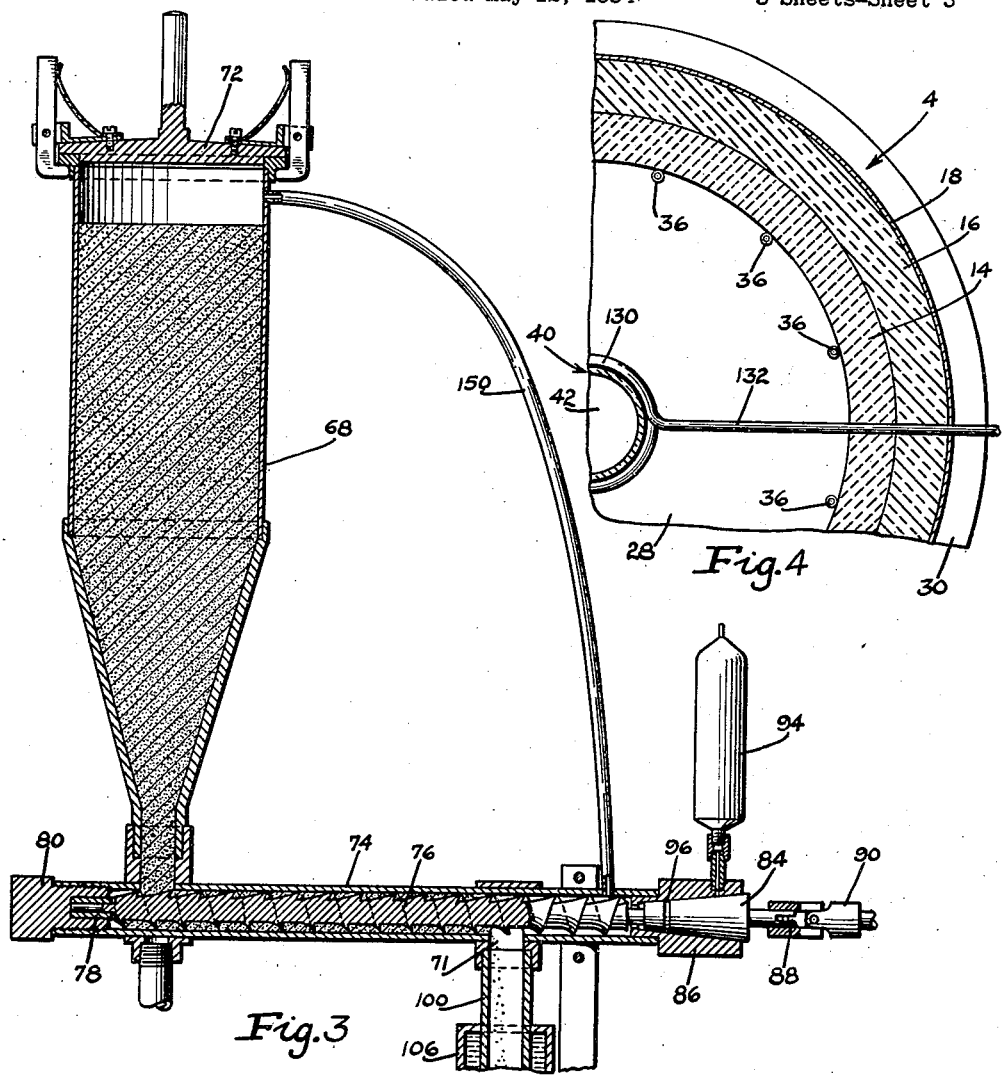
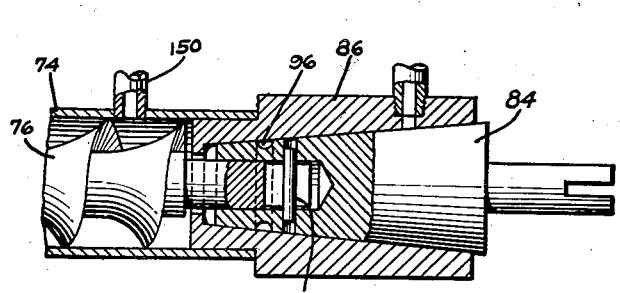
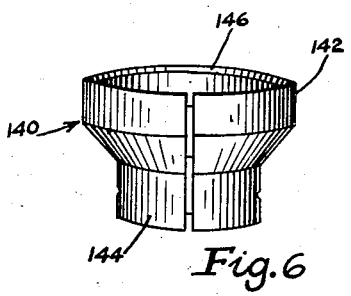
INVENTORS
CHARLES G. FERRARI
LESTER F. BORCHARDT
ATTORNEYS Patented Nov. 18, 1941

UNITED STATES PATENT OFFICE 2,262,995

APPARATUS FOR VAPORIZING AND TREATING MATERIALS UNDER HIGH VACUUM

Charles G. Ferrari and Lester F. Borchardt, Minneapolis, Minn., assignors, by mesne assignments, to General Mills, Inc., a corporation of Delaware Application May 12, 1934, Serial No. 725,408

30 Claims. (Cl. 204—311)

This invention relates to apparatus for vaporizing and treating materials under vacuum, and has particular reference to an apparatus for continuously vaporizing and treating ergosterol or other activatible substances under high vacuum in order to impart thereto the physiological property of curing rickets.

A general object of the invention is to provide a simple and efficient type of apparatus wherein a large supply of ergosterol may be gradually vaporized and treated under vacuum conditions, and the invention furthermore contemplates the provision of an apparatus of this character which is automatic in operation.

Continued heating of ergosterol for long intervals tends to promote decomposition and it is accordingly another object of the invention to provide such an apparatus wherein it is unnecessary to keep the main source of ergosterol heated in order to continuously form ergosterol vapor, and wherein it is unnecessary to keep the collected material in heated condition.

Again, it is an object of the invention to provide an apparatus of this type which is of such nature that the mechanism for gradually feeding ergosterol under high vacuum from the main source is not subject to becoming stuck.

More particularly it is an object of the invention to provide an apparatus of the type mentioned wherein neither the means for feeding the ergosterol to the vaporizing means, nor the discharge portion of the apparatus, is apt to become choked or clogged with solidified condensate.

These and numerous other objects of the invention will become more readily apparent upon a detailed study of the accompanying drawings and specification, wherein only one type of apparatus made in accordance with the invention is illustrated by way of example, together with the appended claims.

Referring more particularly to the drawings:

Figure 1 shows a rear elevation of one form of apparatus made in accordance with the invention;

Figure 2 is a vertical longitudinal cross section along the lines 2—2 of Figure 1;

Figure 3 is a fragmentary cross sectional view disclosing the details of the positively acting mechanical mechanism for supplying ergosterol from the reservoir to the inlet leading to the vaporizing chamber;

Figure 4 is a fragmentary cross sectional view of the furnace for heating the vapor treatment chamber, showing the relative positions of the heating elements and the inlets for the electrical activating coil;

Figure 5 is a detailed cross sectional view showing a bearing of a screw conveyer for feeding ergosterol from the reservoir; and Figure 6 is a detailed view showing a ring used at the outlet of the vapor treatment chamber to collect condensate and prevent choking.

In the drawings, numeral 2 represents a table or other support that may rest upon rollers as shown, which has mounted thereon by means of pipe supports a furnace generally designated at 4, and an upper or super platform 6. Beneath the furnace, the table is cut away to form an opening 8 and beneath this opening there is mounted a sub-platform 10 by means of pipe supports 12.

The oven 4 is here shown as substantially circular in cross section and has a composite peripheral wall formed of an inner layer of refractory material 14 and an outer layer of magnesia asbestos covering 16 which is covered by means of cloth 18. This wall is preferably formed with an opening 20 closed by a window 22 of mica or other suitable substance through which the operator may observe conditions within the oven. The furnace is furthermore provided with top and bottom composite walls generally designated at 24 and 26, each formed of an inner layer 28 and a spaced outer layer of suitable insulating material 30 and 32 such as transite. It will be noted that the outer layer of transite 30 at the bottom of the oven is substantially coextensive in size with the walls of the oven but the upper transite member 32 extends beyond the side of the oven to support a heater 34 which is used for a purpose more specifically pointed out hereinafter. Adjacent the walls of the oven and parallel to its axis are a series of vertically arranged and uniformly spaced electrical heating elements 36 which extend only to a spaced distance below the top of the oven and which terminate at a spaced distance above the bottom of the oven.

The numeral 40 designates generally a tube formed of glass or other suitable material having a main upright portion 42 constituting a vapor treatment chamber which is open at the bottom, and a downwardly bent top portion 44 forming a vaporizing chamber 50 which has a surface 46 upon which material to be vaporized may be dropped through the vertically disposed inlet neck 48 of the vaporizing chamber. As clearly shown in Figure 2, the tube 40 is centrally located with respect to the furnace 4 and extends through the top and bottom thereof, the vaporizing chamber 50 being located above the furnace and at the top of the heater 34, and the vapor treatment chamber 42 being disposed inside of the furnace. Numeral 52 designates an electrical heating coil embedded in asbestos or other suitable material for heating the tube 40 between the vaporizing chamber portion 50 and the vapor treatment chamber portion 42 which is located within the furnace 4. Numeral 51 designates a heating coil also embedded in asbestos for heating the inlet to the vaporizing chamber. The elements 36 and the coil 52 are connected to a source of energy in any desired manner for continuous energization while the apparatus is in operation. The heating coil 51 is arranged to be only periodically energized, as for instance for a period of twenty seconds every five minutes, by means of a circuit connected to any suitable source of energy and including the timing device generally designated at 53 for automatically making and breaking the same.

The super-platform generally designated at 6 comprises a lower supporting member 54 in the form of a hollow rectangle, and a cover member 56 partially covering the same which is secured thereto and provided with an enlarged opening 58. Another cover member 60 is hinged to the fixed cover member 56 and may be swung open to facilitate removal of the tube 40. Secured to the top of the member 56 at either side thereof there is a track 62 upon which is slidably mounted a supporting plate 64 as clearly shown in Figure 1. The blocks 66 on either side of the opening 58 serve to further support the plate 64 as will be apparent from Figure 1.

Suitably mounted upon the slidable plate 64 is a reservoir for ergosterol designated at 68 which may be made of metal or other suitable material and an electric motor 70, together with mechanism driven by the motor for feeding ergosterol from the reservoir. The reservoir is provided with a removable top 72 to enable admission of fresh quantities of ergosterol to the reservoir from time to time, but which top can be closed with a vacuum tight joint. The lower portion of the reservoir communicates by means of a vacuum tight joint with a conduit 74 in which a screw conveyer 76 is rotatably mounted. The left hand end of the conveyer 76, referring to Figure 3, is mounted in a graphite bearing 78 held in a plug 80 which is screw-threaded and sealed in one end of the conduit 74. The other end of the screw conveyer rests in a recess of a conical element 84 which rotates in a bearing 86 that is sealed to one end of the conduit 74 and has a pin and open slot connection 82 therewith as clearly shown in Figure 5. Rotating member 84 has a pin and open slot connection 88 with a universal joint 90 that is connected to a second universal joint 92 which in turn is connected to the drive shaft of the motor 70. For the purpose of lubricating the bearing 86 and providing a vacuum tight connection thereat, the bearing is formed with a connection to a collapsible tube 94 containing suitable grease as shown in Figure 3 which may be squeezed from time to time for purpose of lubrication. In order to prevent the grease from working down into the conveying mechanism, the rotating member 84 is provided with a peripheral groove 96 as will be evident from Figure 5.

As clearly shown in Figure 3, the conveyer conduit 74 is provided with a discharge opening 71 at its lower surface, and adjacent the end of the conduit remote from the reservoir. This opening is connected to the vertical inlet neck 48 of the vaporizing chamber 50 by means of a suitable vertical conduit generally designated at 98 and in this case formed of an upper metallic portion 100 of copper or the like which is secured to the opening 71 by means of a vacuum tight joint at one end and which is secured by means of a vacuum tight joint at its other end to a section of glass or the like 102 which connects under vacuum seal with a similar section 104 that in turn connects with the vertical inlet neck 48 of the vaporizing chamber by means of a vacuum tight joint. The metallic portion 100 of this vertical conduit is provided with a suitable cooling jacket 106 through which water or other suitable cooling fluid may be continuously circulated, preferably through flexible connections.

The connection shown and described between the conveyer conduit 74 and the inlet neck 48 is rigid. Preferably this connection is made flexible with some suitable joint in any desired manner as for example by substituting a metallic tube section having flexible metallic Sylphon bellows formed integrally therewith for the tube section 102.

It will be noted from the above description that the reservoir, electric motor, rotating screw conveyer feeding mechanism, depending metallic conduit section, and its associated cooling jacket are all mounted upon the slidable plate 64 as a unit, and may be accordingly adjusted in such manner as to directly position the open end at the bottom of the metallic conduit section 100 directly above the inlet neck 48 of the vaporizing chamber, it being noted that the position of this inlet neck may vary with different tubes. While no mechanical adjusting means for the plate 64 are shown it will be readily appreciated that any suitable type may be provided if desired.

The lower end of tube 40 extends into and has a vacuum tight connection with a collecting vessel 110 which may be made of metal or other suitable material and which rests upon a plate member 112 having three supports 114 resting on the sub-platform 10. These supports 114 are screw-threaded as shown to enable vertical adjustment. In addition the supporting plate 112 is provided with three radially spaced upstanding lugs 116 having screw-threaded openings receiving screws 118 for horizontally positioning the receptacle 110 upon its supporting plate. The tube 40 is further provided with a pair of vacuum tight outlets 120 each formed with a suitable trap 122 which are cooled in known manner as for instance by solid carbon dioxide and acetone, and connected with any suitable vacuum producing means 124.

A coil of electrically conducting material 130 such as copper or the like is slightly spaced from and surrounds the vapor treatment chamber 42 within the furnace 4 and directly opposite the heating elements 36 and with its axis coincident with that of the oven. This coil is provided with leads 132 and 134 extending outside the furnace and connected to any suitable source of high frequency and high voltage current 136. As shown in Figure 4, the leads are preferably passed through the walls of the furnace at a point intermediate adjacent heating coils 36 inasmuch as arcing might result if these leads were placed too close to the heating elements.

A non-continuous ring 140 which is made of any suitable metallic spring material such as copper and formed as shown in Figure 6 with an enlarged portion 142 and a depending portion of reduced diameter 144 is mounted inside of the tube 40 adjacent the bottom of the furnace and slightly below the heating elements 36, which is the location at which the vapors generated in vaporizing chamber 50 begin to condense. Since this ring is made of spring metal it can be readily inserted by compressing the same and moving it to the point desired where it will engage the inner walls of the tube and remain upon release of the pressure. As shown in Figures 2 and 6, the upper edge of the ring is preferably bevelled at 146 so as to facilitate reception of condensate from walls of the tube. The ring may be coated with any desired metal. Also it may be of glass or the like formed integrally with the tube but a removable spring metal ring as above described is preferable inasmuch as cleaning is facilitated.

Referring again to Figures 1 and 3 it will be observed that a by-pass conduit 150 connects the top of the reservoir 68 with conduit 74 at a point beyond its discharge opening with respect to the reservoir, for the purpose of readily producing a condition of high vacuum above the material in the reservoir. Otherwise air might gradually seep through the ergosterol into the system. This conduit of course has vacuum tight connections at the points indicated and it is of course obvious that all of the other connections heretofore-mentioned in the system in which the ergosterol is contained and through which it passes must also be vacuum tight.

In operation of the device the reservoir 68 is filled with ergosterol or other activatible material in substantially powdered or granular form and the lid 72 is then closed with a vacuum tight seal. The vacuum producing means 124 are set into operation until a very high vacuum, i. e. of the order of from $5 \times 10^{-2}$ millimeters of mercury to $1 \times 10^{-4}$ millimeters of mercury is obtained although it will be appreciated that this range of vacuum is subject to a great deal of variation, especially in the direction of higher vacuum. The heater 34, the heating coil 52 and 36 are energized in order to heat up the tube 40. When the system has been thus evacuated and the tube heated, high frequency and high voltage current is applied to the coil 130, the motor 70 is placed in operation, cooling fluid is circulated through the cooling jacket 106, and the timing device is set in operation to periodically energize the coil 51 for a purpose more fully set forth hereinafter.

The motor rotates the screw conveyor 76 which positively operates continuously to supply small quantities of ergosterol to the vertical conduit 98 leading to the vaporizing chamber 50. As the ergosterol particles strike the vaporizing chamber wall 46 they vaporize very quickly and the vapors thus formed escape into the vapor treating portion 42 of the tube 40 wherein they are subjected to an electrodeless discharge set up by the coil 130. The vapor is maintained in this state during its passage from the vaporizing chamber 50 to the vapor treatment chamber 42 by means of the coil 52, and is maintained in the vapor state while passing through the zone of the coil 130 by means of the heating elements 36. After the vapor passes the bottom of the heating coils 36 and reaches the bottom of the furnace it condenses and collects as a liquid upon the ring 140. As shown in Figure 2 this condensate drops from the end of the depending reduced portion 144 into the receptacle 110, wherein it solidifies, without engaging the side walls of the lower portion of the tube 40.

In the absence of heating coil 51 there might be a tendency for vapor to condense and clog up the inlet to the vaporizing chamber. However, any collection of condensate which there occurs is periodically heated to the melting point by the intermittently operating coil 51 and dropped into the vaporizing chamber, which automatic means for intermittent operation are shown. Manual means may of course be used if desired.

The operation will continue without choking or clogging for an indefinite period of time, i. e. until the supply of ergosterol within the reservoir is exhausted, after which the operation of the system may be interrupted and the collected condensate removed from receptacle 110. The cooling jacket 106 protects the feeding mechanism, heating coil 51 prevents clogging at the vaporizing chamber inlet, and ring 140 prevents choking at the discharge end of tube 40. A high degree of anti-rachitic potency is imparted to the ergosterol by treatment thereof with the electrodeless discharge in the vapor state and the material collected in receptacle 110 may therefore be used in the usual manner for preventing and curing rickets.

While I have shown the vapors in the vapor treatment portion of tube 40 as subjected to an electrodeless discharge, these vapors may, if desired, be subjected to other forms of treatment for purpose of activation at this point. For example, the tube 40 may be made of quartz or other material capable of transmitting ultra violet and a source of this energy may be projected upon the vapor treatment portion of the tube. Again, the vapors may be subject to other forms of electrical treatment such as a high frequency discharge between spaced electrodes whether internal or external with respect to the tube.

It will be observed that the main supply of ergosterol in the reservoir is not maintained in heated condition at any time during the operation, and that the collected, activated ergosterol is also not maintained heated whereby decomposition due to heating is substantially eliminated.

In using the apparatus it is advisable to preheat the commercial ergosterol used in a vacuum oven at temperatures sufficiently high to remove any residual solvents but not high enough to cause decomposition. Ergosterol which is so treated not only is a freely flowing product but does not give rise to objectionable vapors which might spoil the vacuum and contaminate the process. In fact the latter reason is the principal purpose for so preheating the ergosterol.

It will be understood that the term "high-vacuum" as used in the claims refers to a vacuum of the order of those referred to above.

As above stated, activatible substances other than ergosterol may be treated in the apparatus of this invention and the term "ergosterol" where used in the claims will be understood to cover other normally solid activatible substances capable of being converted into material exhibiting the antirachitic, vitamin D property.

We claim as our invention:

1. An apparatus for continuously evaporating solids under high vacuum, comprising a reservoir, a vaporizing chamber connected with the reservoir, mechanical means for gradually feeding solids from the reservoir to the vaporizing chamber, means for maintaining the reservoir and vaporizing chamber under high vacuum, means for heating the solids in the vaporizing chamber thereby to vaporize the same, means for cooling a connection between the reservoir and vaporizing chamber, and means for treating and collecting the vapors formed.

2. In an apparatus for continuously vaporizing and treating solids under high vacuum, a reservoir for the solids, a vaporizing chamber provided with an inlet and an outlet, a vapor treatment chamber connected with the outlet of said vaporizing chamber, mechanical conveyer means for positively and gradually feeding solids from the reservoir to said vaporizing chamber through said inlet, means for maintaining the reservoir and vaporizing chamber and vapor treatment chamber under high vacuum, means for heating the solid material as it is supplied to the vaporizing chamber, and means for collecting the vapors formed, said reservoir being offset from the inlet to said vaporizing chamber.

3. In an apparatus for continuously vaporizing and treating normally solid materials under high vacuum, a reservoir for the materials, a vapor treatment chamber, a vaporizing chamber having a lower wall and an outlet above said wall communicating with said vapor treatment chamber, mechanical conveyer means for gradually feeding material from the reservoir to the vapor chamber in solid form, means for maintaining the reservoir, vaporizing and vapor treatment chambers under high vacuum, means for heating the material supplied to the vaporizing chamber thereby to vaporize the same, and means for collecting the vapors formed.

4. In an apparatus for continuously vaporizing and treating solids under high vacuum, a reservoir, a tube having a main portion constituting a vapor treatment chamber and a bent portion constituting a vaporizing chamber, mechanical conveyer means for gradually feeding solids from the reservoir to the vaporizing chamber, means for maintaining said reservoir and tube under a high vacuum during the operation of said feeding means, means for heating the material supplied to the vaporizing chamber thereby to vaporize the same, and means for collecting the vapors formed.

5. In an apparatus for continuously evaporating and treating solids under high vacuum, a reservoir, a tube having a main upright portion constituting a vapor treatment chamber and a downwardly bent top portion provided with a material supporting surface constituting a vaporizing chamber which is offset from said reservoir, mechanical means for gradually feeding solids from said reservoir to a point above the vaporizing chamber and dropping the same to the material supporting surface thereof, means for maintaining the tube and reservoir under a high vacuum during the operation of said mechanical means, means for heating the material supplied to the vaporizing chamber, and means for collecting the vapors thus formed.

6. An apparatus for continuously treating ergosterol to produce anti-rachitic material, comprising a reservoir, a vaporizing chamber, positive mechanical conveyer means for gradually feeding ergosterol from the reservoir to the vaporizing chamber, a vapor treatment chamber connected with the vaporizing chamber, means for maintaining said vaporizing and vapor treatment chambers under high vacuum, means for heating said chambers in order to vaporize the ergosterol and maintain the same in vapor form during treatment, means for subjecting the vapor to an electrical discharge as it passes through the vapor treating chamber, and means for collecting the vapors thus formed and treated.

7. An apparatus for continuously treating ergosterol to produce anti-rachitic material, comprising a reservoir, a vaporizing chamber, mechanical conveyer means for gradually feeding ergosterol from the reservoir to the vaporizing chamber, a vapor treatment chamber connected with the vaporizing chamber, means for maintaining said vaporizing and vapor treatment chambers under high vacuum, means for heating said chambers in order to vaporize the ergosterol and maintain the same in vapor form during treatment, means for subjecting the vapor to a high voltage high frequency electrical discharge as it passes through said vapor treating chamber, and means for collecting the vapors thus formed and treated.

8. An apparatus for continuously vaporizing ergosterol and treating the same to form anti-rachitic material which comprises a reservoir for the ergosterol, motor operated mechanical means for continuously removing small amounts of ergosterol from the reservoir, means for continuously vaporizing the ergosterol so removed by heating the same under high vacuum, means for subjecting the vapors thus continuously produced to an electrical discharge, and means for collecting the products of the vapors thus formed and treated.

9. An apparatus for continuously vaporizing material under high vacuum, comprising a reservoir for the material, a vaporizing chamber remote from the reservoir and provided with an inlet, mechanical means for gradually feeding material from the reservoir to the vaporizing chamber through said inlet, means for maintaining the vaporizing chamber under a high vacuum while the material is being supplied thereto, means for continuously heating the vaporizing chamber while materal is being supplied thereto, means for periodically heating the inlet of the vaporizing chamber, and means for treating and collecting the material thus vaporized.

10. In an apparatus for continuously vaporizing ergosterol and treating the same to produce anti-rachitic material, a reservoir for the ergosterol, means for continuously removing small amounts of ergosterol from the reservoir and vaporizing the same under high vacuum, an upright tube in which the vapors are treated and in which they are allowed to condense, and a ring circumferentially engaging the inner walls of the tube at a point adjacent that at which the vapors condense, said ring having a depending portion of reduced diameter whereby the vapor condensate is collected by the ring and allowed to drop free of the tube walls.

11. An apparatus for continuously vaporizing ergosterol and treating the same to form anti-rachitic material, comprising a reservoir for the ergosterol, means for continuously removing and vaporizing small amounts of ergosterol from said reservoir under high vacuum, a chamber into which the vapors so produced are admitted and in which they are allowed to condense, means for subjecting the vapors in the chamber to an electrical discharge, and a ring circumferentially engaging the inner walls of the chamber at a point adjacent where the vapors condense, said ring having a depending portion of reduced diameter whereby the vapor condensate is collected by the ring and allowed to drop free of the chamber walls.

12. An apparatus for continuously vaporizing ergosterol and treating the same to form vitamin D, comprising a reservoir, a vaporizing chamber, a vapor treatment chamber connection to the vaporizing chamber, mechanical means for continuously supplying ergosterol from the reservoir to the vaporizing chamber, means for maintaining the vaporizing and vapor treatment chambers under high vacuum, means for heating said vaporizing chamber and a portion of said vapor treatment chamber thereby to vaporize the ergosterol and maintain the same in the vapor state, means for subjecting the vapors in the vapor treatment chamber to an electrical discharge, and a ring circumferentially engaging the inner walls of the vapor treatment chamber at a point adjacent that at which the vapors condense due to cooling, said ring having a depending portion of reduced diameter whereby the vapor condensate is collected by the ring and allowed to drop free of the chamber walls.

13. An apparatus for continuously vaporizing ergosterol and treating the same to form anti-rachitic material, comprising a reservoir, a vaporizing chamber having an inlet at the top thereof, screw conveyer means for continuously conveying small amounts of ergosterol from said reservoir to a point above said vaporizing chamber inlet and permitting the same to drop therein, means for heating the vaporizing chamber thereby to vaporize the material dropped therein, a vapor treatment chamber connected to the vaporizing chamber and in which the vapors are permitted to condense, means for maintaining said vaporizing and vapor treatment chambers under high vacuum, and a ring circumferentially engaging the inner walls of the vapor treatment chamber at a point adjacent that at which the vapors condense, said ring having a depending portion of reduced diameter whereby the vapor condensate is collected by the ring and allowed to drop free of the tube walls.

14. An apparatus for continuously vaporizing ergosterol and treating the same to form anti-rachitic materials, comprising a reservoir for the ergosterol, a vaporizing chamber, connections between said reservoir and chamber including a vertical conduit above said chamber, means for gradually removing small amounts of the ergosterol from said reservoir and dropping the same down said conduit into the vaporizing chamber, means for maintaining the vaporizing chamber under high vacuum, means for heating the vaporizing chamber thereby to vaporize the material supplied thereto, means for cooling a connection between the reservoir and chamber, and means for treating and collecting the vapors formed.

15. An apparatus for continuously vaporizing ergosterol and treating the same to form vitamin D, comprising a reservoir for the ergosterol, a vaporizing chamber, connections between said reservoir and chamber including a vertical conduit above the vaporizing chamber and offset from the reservoir, screw conveyer means for continuously removing small amounts of ergosterol from the reservoir and dropping the same down said vertical conduit into said vaporizing chamber, means for maintaining the vaporizing chamber under high vacuum, means for heating the vaporizing chamber thereby to vaporize the ergosterol supplied thereto, means for cooling a connection between the reservoir and the chamber, and means for treating and collecting the vapors produced.

16. An apparatus for continuously vaporizing ergosterol and treating the same to produce anti-rachitic materials, comprising a reservoir for the ergosterol, a tube having a main upright portion constituting a vapor treatment chamber and a downwardly bent top portion having a material supporting surface and constituting a vaporizing chamber, a vertically disposed inlet conduit extending upwardly from said vaporizing chamber and offset from said reservoir, a screw conveyer for conveying ergosterol from the reservoir to said vertical conduit, vacuum tight bearings for said conveyer, a motor, universal sliding connections between said motor and conveyer for driving the same, means for cooling said conduit, means for heating said vaporizing chamber and the upper portion of said vapor treatment chamber thereby to vaporize the ergosterol supplied to the vaporizing chamber and maintaining the same in vapor state in the upper portion of the vapor treatment chamber, means for maintaining said reservoir, chambers, and connections therebetween under high vacuum, means for subjecting the vapors in said vapor treatment chamber to a high voltage high frequency electrical discharge, a ring circumferentially engaging the inner walls of the vapor treatment chamber at a point adjacent that at which the vapors condense, said ring having a depending portion of reduced diameter whereby the vapor condensate collected by the ring is allowed to drop free of the walls of the tube constituting the vapor treatment chamber, and a collecting vessel positioned beneath said ring for catching the dropped condensate.

17. An apparatus for continuously vaporizing and treating ergosterol under high vacuum to form anti-rachitic material, comprising a closed system having therein a reservoir for containing the ergosterol at a temperature below its melting point, a vaporizing chamber, means for continuously and gradually removing ergosterol in the solid state from the reservoir and supplying it to the vaporizing chamber, and means for collecting vapor produced from said ergosterol in the vaporizing chamber, means for treating ergosterol vapor produced in said vaporizing chamber to impart thereto the anti-rachitic property, means for heating material supplied to said vaporizing chamber to vaporize the same, and means for maintaining said closed system under high vacuum while the ergosterol is being supplied to the vaporizing chamber and during the operation of said heating and treating means.

18. An apparatus for continuously vaporizing and treating ergosterol under high vacuum to form anti-rachitic material, comprising a reservoir for the ergosterol, means for removing ergosterol from said reservoir and vaporizing the same under high vacuum, means for treating the vapors so produced in order to impart thereto the anti-rachitic property, receiving means, and means for collecting the ergosterol in liquid form after such treatment and delivering the same to said receiving means by free transmission through space.

19. An apparatus for continuously vaporizing and treating solid ergosterol under high vacuum to form anti-rachitic material, comprising a reservoir for the solid ergosterol, a vaporizing chamber, mechanical means for positively and gradually supplying solid ergosterol from said reservoir to said vaporizing chamber, means for maintaining said reservoir and vaporizing chamber under high vacuum while said mechanical means are in operation, means for heating the ergosterol in said vaporizing chamber to vaporize the same, means for treating the ergosterol vapors thus produced to impart thereto the anti-rachitic property, means for collecting the ergosterol in liquid form after such treatment, and a receiver positioned below said collecting means, said receiver being at a temperature below the melting point of ergosterol and said collecting means permitting said liquid ergosterol to freely drop into said receiver.

20. An apparatus for continuously vaporizing and treating solid ergosterol under high vacuum to form anti-rachitic material, comprising a reservoir for the solid ergosterol, a vaporizing chamber, mechanical means for positively and gradually supplying solid ergosterol from said reservoir to a point above said vaporizing chamber and permitting the same to freely drop therein, means for maintaining said reservoir and vaporizing chamber under high vacuum while said mechanical means are in operation, means for heating the ergosterol in said vaporizing chamber to vaporize the same, means for treating the ergosterol vapors thus produced to impart thereto the anti-rachitic property, means for collecting the ergosterol in liquid form after such treatment, and a receiver positioned below said collecting means, said receiver being at a temperature below the melting point of ergosterol and said collecting means permitting said liquid ergosterol to freely drop into said receiver.

21. An apparatus for continuously vaporizing and treating ergosterol under high vacuum to form anti-rachitic material, which comprises a reservoir for containing the ergosterol at a temperature below its melting point, a vaporizing chamber, mechanical means for continuously and positively supplying solid ergosterol from the reservoir to the vaporizing chamber, means for heating ergosterol supplied to the vaporizing chamber to vaporize the same, means for treating the vapors thus produced to impart thereto the anti-rachitic property, receiving means, means for collecting the activated ergosterol in liquid form after it has been thus treated and delivering the same to said receiving means by free transmission through space, and means for maintaining said reservoir, conveyer means, vaporizing chamber, and collecting and transmission means under high vacuum while the ergosterol is being so supplied and treated.

22. An apparatus for continuously vaporizing and treating ergosterol under high vacuum, which comprises a reservoir for containing the ergosterol at a temperature below the melting point thereof, a vaporizing chamber, positive mechanical conveyer means for continuously and positively supplying solid ergosterol from the reservoir to the vaporizing chamber, means for heating ergosterol supplied to said vaporizing chamber to vaporize the same, means for treating the ergosterol vapor so produced to impart thereto the anti-rachitic property, a receptacle for collecting the anti-rachitic material so formed at a temperature below the melting point thereof, and means for maintaining said reservoir, mechanical supplying means, vaporizing chamber, and collecting means under high vacuum.

23. An apparatus for continuously vaporizing ergosterol and treating the same to form anti-rachitic material, comprising a reservoir under high vacuum for containing solid ergosterol at a temperature below its melting point, means for continuously removing small amounts of solid ergosterol from said reservoir and vaporizing the same under high vacuum thereby to generate a substantially continuous stream of ergosterol vapor, means for continuously treating said vapor stream in order to activate the same, and means for continuously collecting the vapors so formed and treated at a temperature below the melting point thereof.

24. In an apparatus for continuously vaporizing and treating normally solid material under high vacuum, a closed system having therein a reservoir for containing the said material at a temperature below its melting point, a vaporizing chamber, mechanical means for continuously and positively removing solid material from the reservoir and supplying it to the vaporizing chamber, and means for continuously collecting vapors produced in the vaporizing chamber, a conical bearing including a rotating element having its end of increased diameter exposed outside of said closed system and its end of reduced diameter disposed interiorly thereof and connected to the aforesaid mechanical means, driving means connected to the end of increased diameter of said rotating element, means for heating material supplied to said vaporizing chamber to vaporize the same, and means for maintaining said closed system under high vacuum during the operation of said supplying, heating and collecting means.

25. A high vacuum vaporizing system for solid material including a high vacuum vaporizing chamber, mechanical feed means in the system and operating under the high vacuum therein for supplying a stream of solid material to the vaporizing chamber, external driving means and a drive shaft connecting the same to the mechanical feed means, and a conical bearing for the drive shaft between the driving means and feed means having an outer end of larger diameter outside the vacuum system and having an inner end of smaller diameter inside the vacuum system, said bearing being adapted to prevent outside gases from leaking into the vacuum system.

26. In an apparatus for continuously vaporizing and treating material under high vacuum, a reservoir, a vaporizing chamber connected with the reservoir, means for continuously feeding material from the reservoir to the vaporizing chamber, means for heating the material in the vaporizing chamber to vaporize the same, means for maintaining the reservoir and vaporizing chamber under high vacuum during the operation of said heating and feeding means, means for cooling a connection between the reservoir and vaporizing chamber, and means for continuously collecting the vapors.

27. A continuous flow apparatus for vaporizing and treating an activatible material which is unstable when subjected to increased temperatures for appreciable periods to produce a material having the anti-rachitic property, comprising a reservoir for the material, a vaporizing chamber, mechanical feed means for gradually and continuously feeding material from the reservoir to the vaporizing chamber in quantities small enough to prevent accumulation in the vaporizing chamber, means for treating the vapor formed in the vaporizing chamber continuously as produced to impart thereto the anti-rachitic property, heating means for producing vaporization of the material in the vaporizing chamber and for maintaining the material in vapor form during treatment, means for maintaining the material under high vacuum during vaporization and treatment, and means for continuously collecting the anti-ratchitic material produced at a temperature below the melting point thereof.

28. Apparatus for continuously vaporizing and treating an activatible substance which is unstable when subjected to increased temperatures for appreciable periods to form anti-rachitic material, comprising a reservoir for containing such a substance at a temperature below the melting point thereof, means for continuously feeding a stream of said material from the reservoir in finely divided solid form, vaporizing means including a heated surface disposed in the path of said stream adapted to quickly vaporize the substance as it impinges thereon thereby to continuously produce activatible vapor of the substance, means for continuously treating the vapor so produced to impart thereto the anti-rachitic property, means for continuously collecting the resulting anti-rachitic material at a temperature below the melting point thereof, and means for maintaining said material under high vacuum during passage from the reservoir to the collecting means.

29. A system for treating material under high vacuum including a material treatment chamber, mechanical feed means in the system and operating under the high vacuum for supplying a stream of material in solid form to the treatment chamber, external driving means and a drive shaft connecting the same to the mechanical feed means, and a conical bearing for the drive shaft between the driving means and feed means having an outer end of larger diameter outside the vacuum system and having an inner end of smaller diameter inside the vacuum system, said bearing being adapted to prevent outside gases from leaking into the vacuum system.

30. An apparatus for continuously treating ergosterol or other activatible material to impart the anti-rachitic (vitamin D) property thereto, which comprises a reservoir containing the activatible material in solid form, a chamber for treating the material, positive mechanical conveyor means for continuously and positively supplying solid activatible material from the reservoir to the treatment chamber, means for treating activatible material to impart thereto the anti-ratchitic property, a receptacle for collecting the anti-ratchitic material so formed at a temperature below the melting point thereof, and means for maintaining said reservoir, mechanical supplying means, vaporizing chamber and collecting means under high vacuum.

CHARLES G. FERRARI.
LESTER F. BORCHARDT.